United States Patent [19]

Wilde et al.

[11] 4,407,422
[45] Oct. 4, 1983

[54] COMPOSITE CLOSURE

[75] Inventors: Sheldon L. Wilde; Thomas J. McCandless, both of Crawfordsville; Robert M. Saunders, Ladaga, all of Ind.

[73] Assignee: H-C Industries, Inc., Crawfordsville, Ind.

[21] Appl. No.: 310,769

[22] Filed: Oct. 13, 1981

Related U.S. Application Data

[63] Continuation-in-part of Ser. No. 270,241, Jun. 4, 1981, Pat. No. 4,378,893, which is a continuation-in-part of Ser. No. 77,566, Sep. 21, 1979, abandoned.

[51] Int. Cl.³ .............................................. B65D 53/04
[52] U.S. Cl. .................................. 215/246; 215/329; 215/343; 215/350
[58] Field of Search ............... 215/343, 350, 345, 246, 215/329

[56] References Cited

U.S. PATENT DOCUMENTS

| | | | |
|---|---|---|---|
| 2,068,389 | 1/1937 | Smith | 215/350 |
| 2,607,957 | 8/1952 | Danielson et al. | |
| 3,033,407 | 5/1962 | Isele-Aregger | 215/343 X |
| 3,189,209 | 6/1965 | Owens | 215/350 |
| 3,536,224 | 10/1970 | Green | |
| 4,331,249 | 5/1982 | Banich | 215/343 |

FOREIGN PATENT DOCUMENTS

| | | | |
|---|---|---|---|
| 47374 | 6/1971 | Australia | |
| 851275 | 10/1939 | France | |
| 464721 | 12/1968 | Switzerland | |
| 5304 | of 1825 | United Kingdom | |
| 283447 | 1/1928 | United Kingdom | |
| 1384370 | 2/1975 | United Kingdom | 215/246 |
| 1577663 | 10/1980 | United Kingdom | |

*Primary Examiner*—Donald F. Norton
*Attorney, Agent, or Firm*—Dressler, Goldsmith, Shore, Sutker & Milnamow, Ltd.

[57] ABSTRACT

A composite closure for a bottle or like container is disclosed which includes a compression molded plastic cap and a plastic sealing liner retained within the cap. Effective retention of the sealing liner in position within the plastic cap is provided by an inwardly extending annular lip disposed between an internal thread formation of the plastic cap and its top wall portion, and a ring of projections extending integrally from the inner surface of the top wall portion of the cap. The sealing liner includes an annular bead portion adjacent to and in engagement with the annular lip and ring of projections so that the liner is effectively retained in position within the plastic cap.

31 Claims, 4 Drawing Figures

COMPOSITE CLOSURE

CROSS REFERENCE TO RELATED APPLICATIONS

This application is a continuation-in-part of application Ser. No. 270,241, now U.S. Pat. No. 4,378,893, filed June 4, 1981, which is a continuation-in-part of application Ser. No. 77,566, filed Sept. 21, 1979, now abandoned.

BACKGROUND OF THE INVENTION

The present invention relates to closures for containers, and more particularly to a composite plastic closure for bottles.

The advantages of plastic composite closures for use on bottles and like containers have been recognized in recent years, and various attempts have been made of perfecting a suitable closure capable of effectively sealing a container. Parent application Ser. No. 270,241 discloses a composite plastic closure including a plastic shell or cap, and a plastic sealing liner. Means for retaining the liner within the cap include an annular lip extending inwardly of the cap which engages an annular sealing bead portion of the liner. Liner retention may be further provided by a plurality of pedestals or projections which extend integrally from the inner surface of the top wall portion of the plastic cap. Portions of that application not inconsistant with the present disclosure are incorporated herein by reference.

Effective sealing liner retention within the plastic cap of the closure poses a problem where the container to which the closure is applied has contents, such as a carbonated beverage, which include a gaseous medium. Migration of the gas in the container through the sealing liner may tend to dislodge the liner from the cap, thereby detracting from the effective sealing capabilities of the closure. Thus, a composite closure suited for use on a container which has contents containing a gaseous medium must be designed so that the sealing liner of the closure is held in a position to effect proper sealing.

The present invention improves upon plastic composite closures heretofore known by providing a liner retention arrangement which maintains the sealing liner in position to effect proper sealing.

SUMMARY OF THE INVENTION

The composite closure of the present invention includes a compression molded cup-like plastic cap or shell having a top wall portion and an integral annular skirt portion depending therefrom. The skirt portion includes an internal thread formation which is adapted to cooperate with a like thread formation on the finish of the container neck to which the closure is applied. The closure may include an integrally formed pilfer band which depends from the skirt portion of the cap, and is adapted to engage the container for indicating removal of the closure.

The composite closure further includes a plastic sealing liner positioned within the plastic cap generally adjacent to the top wall portion thereof. The sealing liner includes a relatively thin central portion, and a relatively thicker annular sealing bead portion which is adapted to engage the container to effect sealing therewith.

The sealing liner is retained within the plastic closure cap by liner retaining means formed integrally with the cap. A liner retaining annular lip extends inwardly of the cap between the thread formation and top wall portion thereof, and defines with the top wall portion an annular recess within which at least a portion of the annular bead portion of the liner is disposed. Preferably, the annular lip has an inside diameter less than or generally equal to the inside diameter of the thread formation of the cap.

Liner retention is further provided by a ring of circumferentially spaced projections which extend integrally from the inner surface of the top wall portion of the cap. The projections engage the annular sealing portion of the liner for retention of the liner within the plastic cap. Each projection is preferably generally cylindrical, but it will be appreciated that other configurations for the projections could also be used.

Other advantages and features of the present invention will become readily apparent from the following description thereof, from the claims and from the accompanying drawings in which like numerals are employed to designate like parts throughout the same.

DETAILED DESCRIPTION

Figure 1:
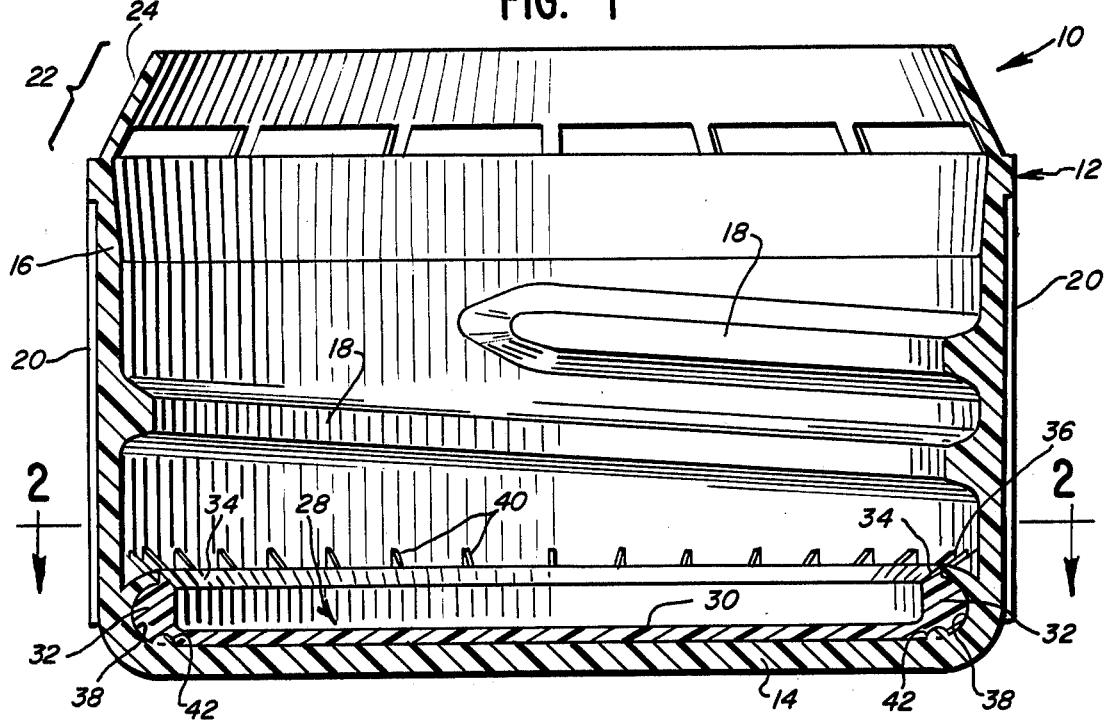
FIG. 1 is an elevational view in cross-section of the composite closure of the present invention.
Figure 2:
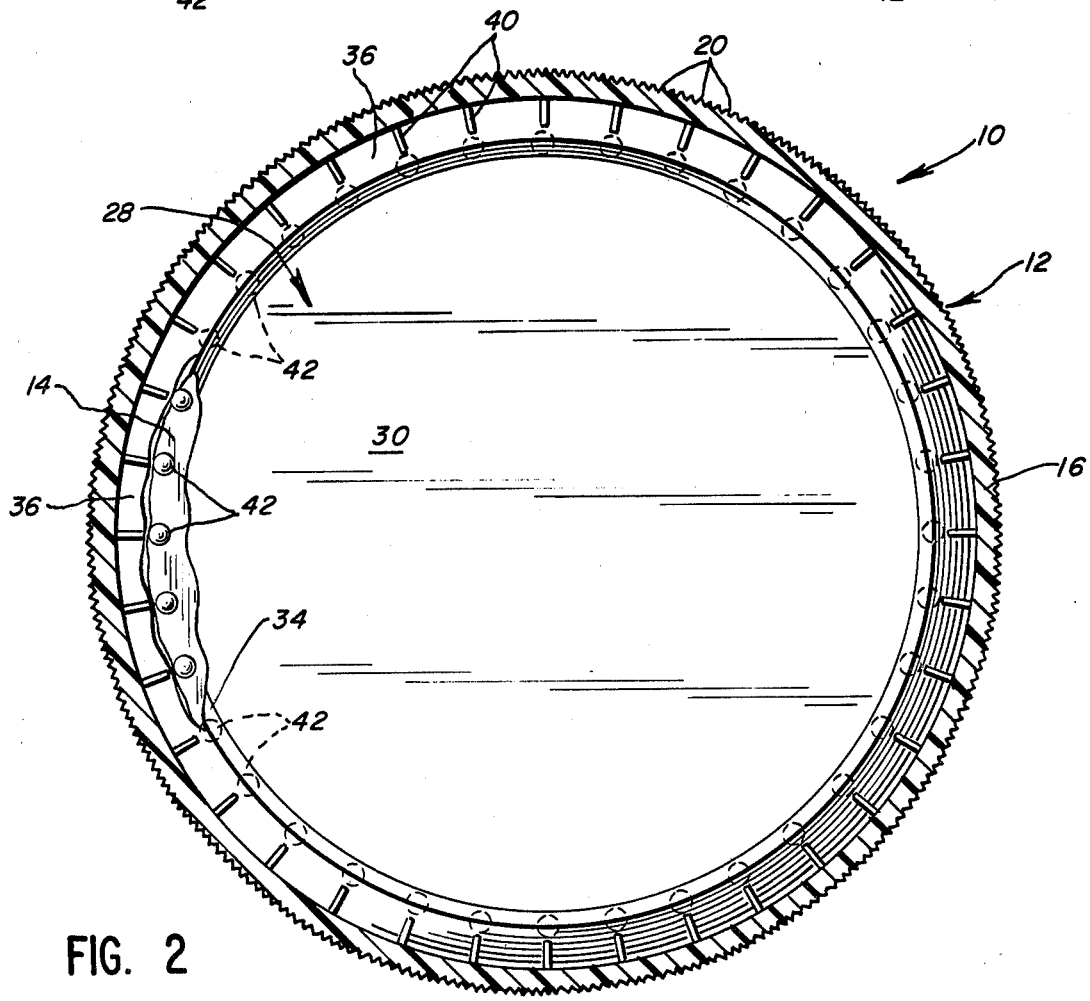
FIG. 2 is a view taken along line 2—2 of FIG. 1.

With reference now to FIGS. 1 and 2, therein is illustrated composite closure 10. Closure 10 includes a cup-like plastic cap or shell 12, which is preferably compression molded, having a top wall portion 14 and an annular generally cylindrical skirt portion 16 depending therefrom. Skirt portion 16 includes an internal thread formation 18 which is adapted to cooperate with a like thread formation on the exterior finish of the neck of a container to which closure 10 is applied. As shown, thread formation 18 may be truncated to provide clearance for tooling for forming the liner of the closure, as will be described. Circumferentially spaced finger ribs 20 are provided on the outer surface of skirt portion 16 to facilitate gripping of the closure.

When desired, closure 10 may be provided with a pilfer band 22 for indicating removal of the closure from the container. Pilfer band 22 may be heat deformable, and may include a heat skrinkable band portion 24 integrally connected with skirt portion 16 by a plurality of circumferentially spaced bridges 26. Pilfer band 22 is formed generally as shown in FIG. 1 during formation of plastic cap 12, and is then stretched outwardly. Most or all of bridges 26 may be scored by a knife or like tool so they are substantially weakened and thus fracturable. After closure 10 is applied to a container, the application of heat to pilfer band 22 causes it to shrink back to a configuration generally as shown in FIG. 1 so that it is adapted to engage a portion of the container neck. Removal of the closure from the container results in the fracture of one or more of bridges 26, thereby clearly indicating opening of the container.

Composite closure 10 further includes a sealing liner 28 (shown partially cutaway in FIG. 2) formed of substantially fluid impervious moldable thermoplastic, such as polyvinyl chloride (PVC), or ethylene vinyl acetate (EVA). Sealing liner 28 includes a relatively thin central portion 30, and a relatively thicker annular sealing bead portion 32. Bead portion 32 includes frustoconical sealing surface 34 which is adapted to sealingly engage the finish of the container to which the closure is applied.

Retention of sealing liner 28 in position within plastic cap 12 is important to effecting proper sealing of the container. To this end, liner retention is provided by annular lip 36 (shown partially cutaway in FIG. 2) which engages bead portion 32 of liner 28. As shown, lip 36 extends inwardly of cap 12 between thread formation 18 and top wall portion 14, and defines with the top wall portion 14 annular recess 38 within which at least a portion of bead portion 32 of the sealing liner is disposed. A plurality of integral, circumferentially spaced reinforcing gussets 40 may be provided for reinforcing annular lip 36.

In this embodiment, the inside diameter of lip 36 is less than the inside diameter of thread formation 18. This permits the advancement of a lip-engaging sleeve coaxially with a liner-forming plunger during formation of liner 28. As described in related application Ser. No. 077,584, filed Sept. 29, 1979, issued as U.S. Pat. No. 4,343,754, liner 28 is formed by depositing a pellet of liner material into closure cap 12, and compressing the liner material so that it flows into annular recess 38 and against annular lip 36. Additional clearance for the lip-engaging sleeve used during the liner forming process may be provided by use of a thread formation 18 having truncated threads. In this regard, the innermost portion of reinforcing gussets 40 are spaced from the inner edge of lip 36 to accommodate engagement of the lip-engaging sleeve with the lip as described.

Retention of sealing liner 28 is further provided by a ring of circumferentially spaced projections 42 extending integrally from the inner surface of top wall portion 14 adjacent skirt portion 16. Each of projections 42 preferably has a generally cylindrical configuration, with the projections spaced at approximately ten degree increments about the axis of closure 10. It will be appreciated that the exact configuration and number of projections 42 is a matter of design choice, with the arrangement shown having been found to exhibit the desired liner retention properties. Projections 42 may be formed as shown by providing a ring of holes in the face of the male mold member or plunger which forms cap 12 during compression molding thereof.

Projections 42 are positioned adjacent to and in engagement with bead portion 32 of liner 28. When the inside diameter of the ring of projections 42 is less than the smallest inside diameter of bead portion 32 of liner 28, the projections preferably extend a distance from the inside surface of top wall portion 14 less than the thickness of central portion 30 of liner 28. This obviates problems of the projections extending through liner 28 which can negate the fluid impervious nature of the liner.

As shown, the inside diameter of the ring of projections 42 is less than the inside diameter of annular lip 36, while the outside diameter of the ring of projections is greater than the inside diameter of lip 36. Thus, a portion of each projection 42 is disposed within annular recess 38 so that there is some "overlap" of the projections by lip 36. It will be appreciated that projections 42 may be disposed adjacent skirt portion 16 by providing the ring of projections with an inside diameter greater than or equal to the inside diameter of lip 36, or the projections 42 may be disposed inwardly of lip 36 adjacent skirt portion 16 such that the outside diameter of the ring of projections is less than or equal to the inside diameter of lip 36 but located in the outer region of liner 28.

Figure 3:
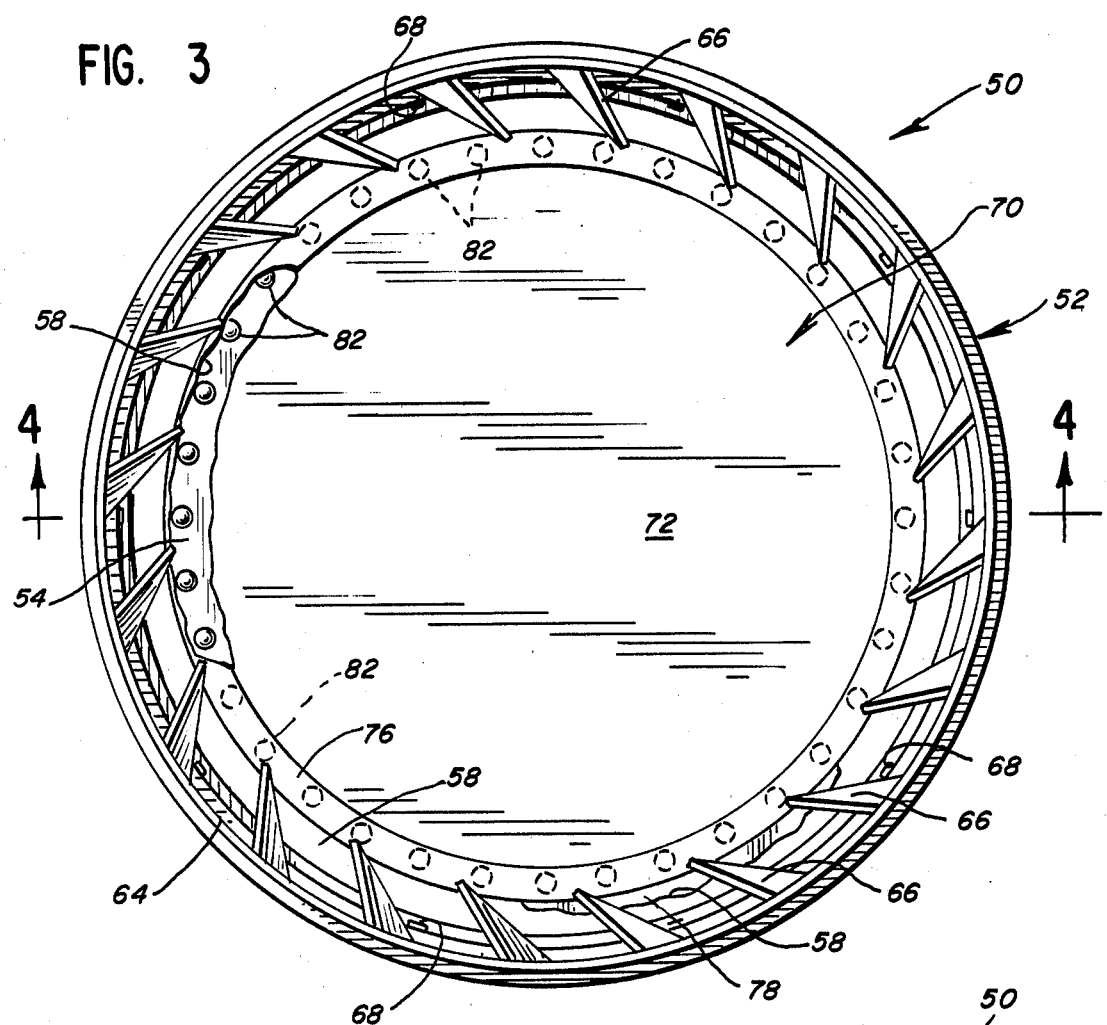
FIG. 3 is a plan view of a further embodiment of the composite closure of the present invention.
Figure 4:
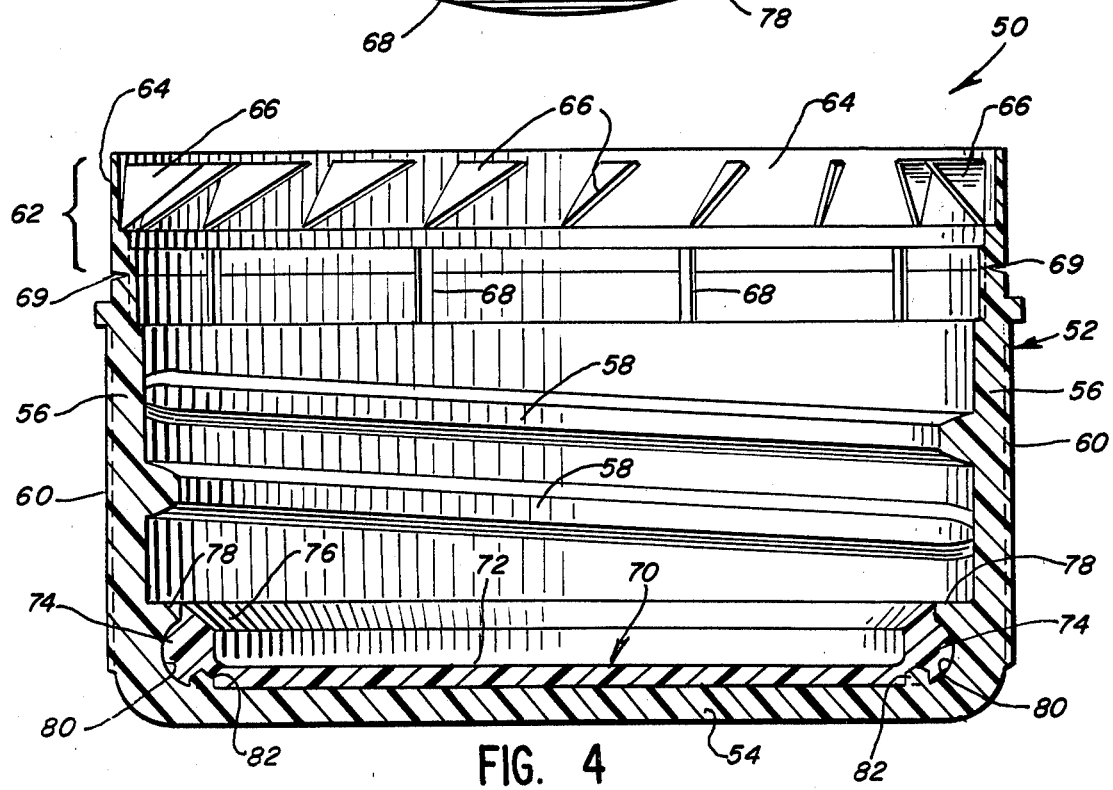
FIG. 4 is a view taken along line 4—4 of FIG. 3.

With reference now to FIGS. 3 and 4, therein is shown composite closure 50 illustrating a further embodiment of the present invention. Closure 50 includes a cup-like plastic cap or shell 52, preferably compression molded, having a top wall portion 54 and a generally cylindrical annular skirt portion 56 depending therefrom. Skirt portion 56 includes an internal thread formation 58 (shown partially cutaway in FIG. 3), which may include truncated threads. Circumferentially spaced finger ribs 60 are provided on the external surface of skirt portion 56 to facilitate gripping of the closure.

Closure 50 may include a pilfer band 62 depending from skirt portion 56 integrally formed with plastic cap 52. As more fully described in application Ser. No. 286,375, filed July 24, 1981, pilfer band 62 includes a band portion 64 from which integral fingers or wings 66 inwardly extend. A plurality of circumferentially spaced ribs 68 extend between pilfer band 62 and skirt portion 56. After the formation of pilfer band 62, integrally with plastic cap 52, a score 69 is cut between the cap and the pilfer band so that only ribs 68 hold them together. Score 69 may extend into one or more of ribs 68. Engagement of fingers 66 with an annular locking ring on the exterior of the container during removal of the closure results in fracture of some or all of bridges 68 so that pilfer band 62 is partially or completely separated from cap 52.

Closure 50 further includes a sealing liner 70 formed from substantially fluid impervious moldable thermoplastic. Liner 70 includes a disc-like, relatively thin central portion 72 and a relatively thicker annular sealing bead portion 74. Bead portion 74 includes frustoconical sealing surface 76 adapted to sealing engage the finish of the container to which the closure is applied.

Retention of sealing liner 70 within plastic cap 52 is provided by an annular lip 78 which extends inwardly of cap 52 between thread formation 58 and top wall portion 54. Lip 78 defines an annular recess 80 together with top wall portion 54 within which at least a portion of bead portion 74 of liner 70 is disposed. Lip 78 engages and retains bead portion 74 of liner 70, and confines the liner forming material during formation of the liner as described above.

In this embodiment, the inside diameter of lip 78 is generally equal to the inside diameter of thread formation 58. Since it is preferred to advance a lip-engaging sleeve coaxially with the liner-forming plunger liner formation as described, this configuration of lip 78 and thread formation 58 will typically require that the cap 52 is stretched somewhat after formation, such as by a conically shaped tool. This provides additional clearance during liner formation, but may be accomplished without significant permanent deformation of the cap.

Retention of sealing liner 70 is further provided by a plurality of projections 82 extending integrally from the inner surface of top wall portion 54 adjacent skirt portion 56. Projections 82 are circumferentially spaced and arranged in a ring so that they are adjacent to and engage bead portion 74 of liner 70. In this embodiment, the inside and outside diameters of the ring of projections 82 are both less than the inside diameter of annular lip 78 so that projections 82 are disposed just inwardly of annular recess 80.

As discussed, composite closures of the type herein disclosed are preferably designed so that they are suited for use on containers having contents which include a gaseous medium, such as a carbonated beverage. Problems have been encountered in the past where migration of gas through the sealing liner of the closure after application to a container dislodges the liner so that proper sealing of the container is not effected. The liner retention arrangement of the composite closure of the present invention obviates the problem of liner dislocation, even though gas may migrate through the liner and accumulate between the central portion of the liner and the top wall portion of the plastic cap. It has been found that the effect of gas migration through the liner of the present closure results in a slight separation of the central portion of the sealing liner from the inner surface of the top wall portion of the plastic cap, with the maximum separation being on the order of 1/32 of an inch. The liner of the closure has been found to then stabilize in this disposition, without detrimental effect to the sealing capabilities of the closure.

As noted, the exact configuration of the ring of projections extending from the top wall portion of the closure cap is a matter of design choice. For instance, both the inside and outside diameters of the ring of projections may be greater then the inside diameter of the annular lip of the closure cap such that the projections are substantially completely disposed within the annular recess defined by the annular lip and the top wall portion of the closure cap. Alternatively, the inside and outside diameters of the ring of projections may both be less than the inside diameter of the inwardly extending annular lip (as in FIGS. 3 and 4), or the inside and outside diameter of the ring of projections may be respectively less than and greater than the inside diameter of the inwardly extending annular lip (as in FIGS. 1 and 2). Preferably, the liner retaining annular lip and ring of projections cooperate in an interlocking fashion with the sealing liner to effect liner retention.

From the foregoing, it will be understood that various modifications and substitutions can be made by those skilled in the art without departing from the novel spirit and scope of the present invention.

What is claimed is:

1. A composite closure for a container, comprising
a plastic cap having a top wall portion and an annular skirt portion having a thread formation,
a disc-shaped plastic sealing liner disposed within said cap generally adjacent said top wall portion including an annular sealing portion having a generally inwardly facing sealing surface, and
means for retaining said liner within said cap comprising a plurality of projections on the inner surface of said top wall portion arranged in circumferentially spaced relation in a ring engaging said annular sealing portion.

2. The composite closure of claim 1, wherein said retaining means further include an annular lip extending inwardly of said cap between said thread formation and said top wall portion in engagement with said annular sealing portion.

3. The composite closure of claim 2, wherein said annular sealing portion is substantially thicker than the central portion of said liner.

4. The composite closure of claim 3, wherein the inside diameter of said ring of projections is less than the inside diameter of said annular lip.

5. The composite closure of claim 4, wherein the outside diameter of said ring of projections is less than the inside diameter of said annular lip.

6. The composite closure of claim 3 wherein the inside diameter of said ring of projections is greater than the inside diameter of said annular lip.

7. A composite closure for a container, comprising:
a plastic cap having a top wall portion and an annular skirt portion having a thread formation,
a plastic sealing liner disposed within said cap generally adjacent said top wall portion including an annular sealing portion, and
means for retaining said liner within said cap comprising a plurality of projections on the inner surface of said top wall portion arranged in circumferentially spaced relation in a ring engaging said annular sealing portion,
said retaining means further including an annular lip extending inwardly of said cap between said thread formation and said top wall portion in engagement with said annular sealing portion, said annular sealing portion being substantially thicker than the central portion of said liner, the inside diameter of said ring of projections being less than the inside diameter of said annular lip, and the outside diameter of said ring of projections being greater than the inside diameter of said annular lip.

8. The composite closure of claims 4, 7, 5, or 6, wherein
each of said projections is generally cylindrical.

9. The composite closure of claim 8, and
pilfer band means formed integrally with said skirt portion of said cap.

10. The composite closure of claim 7, wherein each of said projections is generally cylindrical.

11. The composite closure of claim 7, and
pilfer band means formed integrally with said skirt portion of said cap.

12. A composite closure for a container, comprising
a plastic cap having a top wall portion and an annular skirt portion,
a plastic cap sealing liner formed in said cap and disposed within said cap adjacent said top wall portion, and
means for retaining said liner within said cap comprising a plurality of projections on the inner surface of said top wall portion arranged in circumferentially spaced relation in a ring adjacent said skirt portion, and an inwardly extending, liner engaging annular lip spaced from said top wall portion.

13. The composite closure of claim 12, wherein
said sealing liner includes a central portion and a relatively thick annular sealing bead portion, said projections engaging said annular bead portion.

14. A composite closure for a container, comprising
a compression molded plastic cap having a top wall portion and an annular skirt portion having an internal thread formation,
a plastic sealing liner positioned within said cap generally adjacent said top wall portion, said liner having a central portion and an annular sealing bead portion, and
liner retaining means comprising an integral annular lip extending inwardly of said cap between said thread formation and top wall portion and defining with said top wall portion an annular recess within which at least a portion of said annular bead portion is disposed, said annular lip having an inside diameter generally equal to or less than the inside diameter of said thread formation, and a ring of circumferentially spaced projections extending integrally from the inner surface of said top wall portion in engagement with said annular bead portion.

15. The composite closure of claim 11, wherein the inside diameter of said ring is less than the inside diameter of said lip.

16. A composite closure in accordance with claim 15, wherein the outside diameter of said ring is les than the inside diameter of said lip.

17. The composite closure of claim 14, wherein said projections extend a distance from the inner surface of said top wall portion less than the thickness of said central portion of said sealing liner.

18. The composite closure of claim 14, including pilfer band means formed integrally with said skirt portion including a plurality of circumferentially spaced, relatively flexible inwardly extending projections.

19. A composite closure for a container, comprising
a compression molded plastic cap having a top wall portion and an annular skirt having an internal thread formation,
a plastic sealing liner positioned within said cap generally adjacent said top wall portion, said liner having a central portion and an annular sealing bead portion, and
liner retaining means comprising an integral annular lip extending inwardly of said cap between said thread formation and said top wall portion and defining with said top wall portion an annular recess within which a portion of said annular bead portion is disposed, said annular lip having an inside diameter generally equal to or less than the inside diameter of said thread formation, and a ring of circumferentially spaced projections extending integrally from the inner surface of said top wall portion in engagement with said annular bead portion, the inside diameter of said ring being less than the inside diameter of said lip, and the outside diameter of said ring being greater than the inside diameter of said lip.

20. A composite closure for a container, comprising
a compression molded plastic cap having a top wall portion and an annular skirt having an internal thread formation,
a plastic sealing liner positioned within said cap generally adjacent said top wall portion, said liner having a central portion and an annular sealing bead portion, and
liner retaining means comprising an integral annular lip extending inwardly of said cap between said thread formation and said top wall portion and defining with said top wall portion an annular recess within which at least a portion of said annular bead portion is disposed, said annular lip having an inside diameter generally equal to or less than the inside diameter of said thread formation, and a ring of circumferentially spaced projection extending integrally from the inner surface of said top wall portion in engagement with said annular bead portion, wherein the inside diameter of said ring is greater than the inside diameter of said lip.

21. The composite closure of claims 19 or 20, wherein said annular bead portion of said liner includes a generally inwardly facing sealing surface.

22. The composite closure of claim 21, and pilfer band means formed integrally with the skirt portion of said cap.

23. The composite closure of claim 22, wherein said pilfer band means comprises a heat shrinkable pilfer band.

24. The composite closure of claim 22, wherein said pilfer band means comprises a plurality of fingers adapted to engage an associated locking ring on the outer surface of said container.

25. A composite closure for a container, comprising
a compression molded plastic cap having a top wall portion and an annular skirt having an internal thread formation,
plastic sealing liner positioned within said cap generally adjacent said top wall portion, said liner having a central portion and an annular sealing bead portion, and
liner retaining means comprising an integral annular lip extending inwardly of said cap between said thread formation and top wall portion and defining with said top wall portion an annular recess within which at least a portion of said annular bead portion is disposed, said annular lip having an inside diameter generally equal to or less than the inside diameter of said thread formation, and a ring of circumferentially spaced projections extending integrally from the inner surface of said top wall portion in engagement with said annular bead portion, and gusset means formed integrally with said plastic cap for reinforcing said annular lip.

26. A composite closure, comprising:
a molded plastic cap having a top wall portion and a depending annular skirt portion, said cap including an inwardly extending lip spaced from said top wall portion and defining an annular recess therewith having a generally concave, inwardly facing surface; and
a plastic sealing liner disposed adjacent said top wall portion, and including an annular sealing portion having a generally inwardly facing sealing surface, said annular sealing portion substantially filling said annular recess;
said cap including liner retention means integral with said top wall portion and in engagement with said sealing liner for retaining said liner in position within said cap.

27. The composite closure of claim 26, wherein said liner retention means comprises a plurality of circumferentially spaced projections in engagement with said annular sealing portion of said liner.

28. A composite closure, comprising
a molded plastic cap having a top wall portion, a depending annular skirt portion, and an inwardly extending annular lip spaced from said top wall portion and defining an annular recess therewith; and
a plastic sealing liner formed in said cap, including an annular sealing portion engaging said annular lip and substantially filling said recess, said lip being adapted to provide support for sleeve means advanced into said cap during formation of liner in said cap;
said cap including liner-engaging means integral with said top wall portion adapted to cooperate with said lip for retaining said liner within said cap.

29. The composite closure of claim 28, wherein said sealing liner includes a central portion, said annular sealing portion being relatively thicker than said central portion, said liner-engaging means comprising a plurality of projections in engagement with said annular sealing portion.

30. The composite closure of claim 29, and
pilfer means depending from said skirt portion including a plurality of inwardly extending, relatively flexible projections.

31. The composite closure of claim 28, including gusset means integral with said plastic cap for reinforcing said annular lip, said gusset means being spaced from the inward edge of said lip to facilitate support of said sleeve means by said lip.

* * * * *